(12) United States Patent
Urai et al.

(10) Patent No.: US 9,520,699 B2
(45) Date of Patent: Dec. 13, 2016

(54) SWITCHGEAR

(71) Applicant: Hitachi, Ltd., Chiyoda-ku, Tokyo (JP)

(72) Inventors: Hajime Urai, Tokyo (JP); Yasuaki Aoyama, Tokyo (JP); Hiroaki Hashimoto, Tokyo (JP); Tatsuro Kato, Tokyo (JP); Ayumu Morita, Tokyo (JP); Toshiaki Rokunohe, Tokyo (JP); Yoichi Oshita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 10 days.

(21) Appl. No.: 14/395,287

(22) PCT Filed: Mar. 27, 2013

(86) PCT No.: PCT/JP2013/058899
§ 371 (c)(1),
(2) Date: Oct. 17, 2014

(87) PCT Pub. No.: WO2013/157360
PCT Pub. Date: Oct. 24, 2013

(65) Prior Publication Data
US 2015/0131207 A1 May 14, 2015

(30) Foreign Application Priority Data
Apr. 18, 2012 (JP) ................................ 2012-094331

(51) Int. Cl.
*H02B 5/01* (2006.01)
*H02B 5/06* (2006.01)
(Continued)

(52) U.S. Cl.
CPC .............. *H02B 13/035* (2013.01); *H01H 3/26* (2013.01); *H01H 3/32* (2013.01); *H01H 31/003* (2013.01);
(Continued)

(58) Field of Classification Search
None
See application file for complete search history.

(56) References Cited

U.S. PATENT DOCUMENTS 6,242,708 B1 * 6/2001 Marchand .......... H01H 33/6661
218/153
6,335,502 B1 * 1/2002 Kikukawa .......... H02B 13/0354
218/10
(Continued)

FOREIGN PATENT DOCUMENTS

EP  1 361 633 A2  11/2003
JP  5-89755 A  4/1993
(Continued)

OTHER PUBLICATIONS

International Search Report (PCT/ISA/210) dated Apr. 23, 2013 with English translation (Five (5) pages).
(Continued)

*Primary Examiner* — Courtney Smith
(74) *Attorney, Agent, or Firm* — Crowell & Moring LLP

(57) ABSTRACT

An object is to provide a switchgear having a simple structure. To solve the problem, a switchgear according to the invention is characterized by having a fixed side electrode 3, a movable side electrode 4 configured to come into contact with or separate from the fixed side electrode 3, and an operating mechanism configured to allow drive force for movement of the movable side electrode 4 to be generated, wherein the operating mechanism for operating the movable side electrode 4 includes one operating mechanism, and the one operating mechanism allows the movable side electrode 4 to stop at three or more positions.

8 Claims, 11 Drawing Sheets

(51) Int. Cl.
*H02B 13/035* (2006.01)
*H01H 33/42* (2006.01)
*H01H 31/00* (2006.01)
*H01H 33/36* (2006.01)
*H01H 3/32* (2006.01)
*H02B 13/075* (2006.01)
*H01H 3/52* (2006.01)
*H01H 33/50* (2006.01)
*H01H 3/26* (2006.01)
*H02K 41/03* (2006.01)

(52) U.S. Cl.
CPC ............ *H01H 33/36* (2013.01); *H01H 33/42* (2013.01); *H02B 13/075* (2013.01); *H01H 3/52* (2013.01); *H01H 33/50* (2013.01); *H01H 2003/268* (2013.01); *H01H 2223/002* (2013.01); *H02B 5/01* (2013.01); *H02B 5/06* (2013.01); *H02K 41/031* (2013.01)

(56) References Cited

U.S. PATENT DOCUMENTS

| | | | | |
|---|---|---|---|---|
| 6,498,314 B2* | 12/2002 | Miyo | ............... | H01H 33/662 218/118 |
| 7,223,932 B2* | 5/2007 | Kobayashi | ........... | H01H 33/666 218/10 |
| 8,035,054 B2* | 10/2011 | Ozawa | ............... | H02B 13/01 218/55 |
| 8,411,418 B2* | 4/2013 | Kikukawa | ............ | H01H 33/666 361/604 |
| 2004/0201943 A1 | 10/2004 | Takeuchi et al. | | |
| 2009/0159568 A1* | 6/2009 | Ozawa | ............... | H02B 13/01 218/140 |
| 2010/0122967 A1* | 5/2010 | Morita | ............ | H01H 33/66207 218/140 |

FOREIGN PATENT DOCUMENTS

| | | | |
|---|---|---|---|
| JP | 5-159668 | A | 6/1993 |
| JP | 9-7468 | A | 1/1997 |
| JP | 10-308145 | A | 11/1998 |
| JP | 2002-051416 | A | 2/2002 |
| JP | 2002-281618 | A | 9/2002 |
| JP | 2004-088825 | A | 3/2004 |
| JP | 2004-127802 | A | 4/2004 |
| JP | 2004-288502 | A | 10/2004 |
| JP | 2011-029004 | A | 2/2011 |
| KR | 20030065562 | A | 8/2003 |

OTHER PUBLICATIONS

Korean-language Office Action issued in counterpart Korean Application No. 10-2014-7029052 dated Mar. 29, 2016 with English translation (Nine (9) pages).

* cited by examiner

CLOSE POSITION P0

OPEN POSITION P1

DISCONNECTING POSITION P2

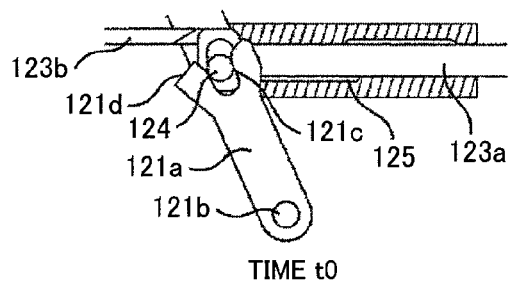
FIG. 15A
TIME t0
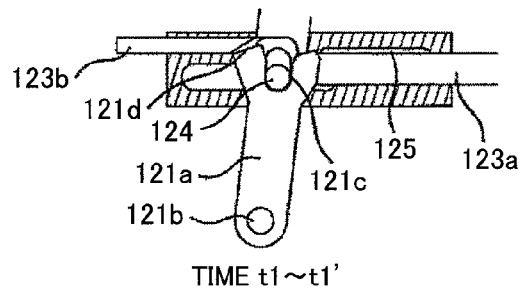
FIG. 15B
TIME t1~t1'
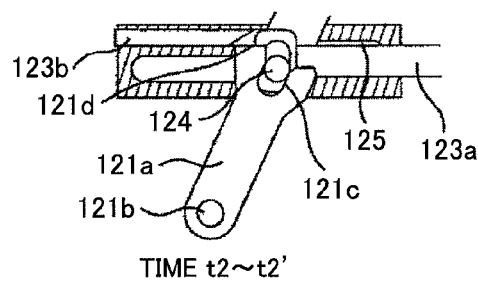
FIG. 15C
TIME t2~t2'
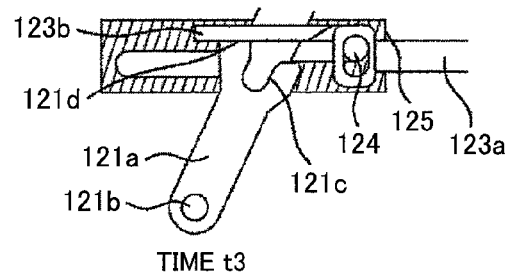
FIG. 15D
TIME t3
FIG. 16
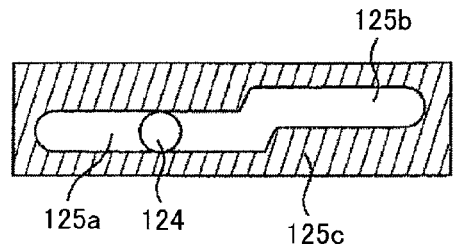

TIME t0

TIME t1~t1'

TIME t2~t2'

TIME t3

// SWITCHGEAR

TECHNICAL FIELD

The present invention relates to a high-voltage switchgear used in a substation or a switching station of a power system, more specifically relates to a switchgear compositely having a plurality of functions such as a disconnecting function, an earthing function, and the like.

BACKGROUND ARTS

The power switchgear provided in a substation or a switching station has a circuit breaker configured to interrupt a current at a short-circuit fault of a power system, a disconnector configured to switch the power system, and an earthing switch configured to earth a high-voltage conductor during inspection or the like. Examples of conventional technologies on the power switchgear include those described in patent document 1 to patent document 4.

The patent document 1 discloses a gas-insulated composite switchgear including a circuit breaker, a disconnector, and an earthing switch. The circuit breaker is accommodated in an interrupting unit container filled with an insulating gas. The disconnector and the earthing switch are accommodated in the same container filled with the insulating gas on a side opposite to a side close to the interrupting unit. An operating mechanism is separately provided for each of the circuit breaker, the disconnector, and the earthing switch.

The patent document 2 describes an example of a hydraulic operating mechanism of a sealed switchgear having a circuit breaker, a disconnector, and an earthing switch. In the hydraulic operating mechanism of the patent document 2, one hydraulic generator is provided in common with the circuit breaker, the disconnector, and the earthing switch, and is connected via an electromagnetic valve to a hydraulic cylinder that drives each of the circuit breaker, the disconnector, and the earthing switch.

In the conventional technologies, operating mechanisms for individually driving the circuit breaker, the disconnector, and the earthing switch are separately provided for configuring the switchgear including such devices.

Furthermore, patent document 3 and patent document 4 describe a spring operating mechanism that accumulates power in a spring and a hydraulic operating mechanism that stores power in an accumulator, respectively, each of which is used for operating the conventional circuit breaker.

CITATION LIST

Patent Document

Patent document 1: Japanese Patent Application Laid-Open No. 2002-281618.
Patent document 2: Japanese Patent Application Laid-Open No. H05-159668.
Patent document 3: Japanese Patent Application Laid-Open No. 2011-29004.
Patent document 4: Japanese Patent Application Laid-Open No. 2004-127802.

SUMMARY OF THE INVENTION

Technical Problem

In each of the various modes of switchgears described in the patent document 1 to the patent document 4, a mechanism generating or transmitting operating force is achieved using a large number of components, resulting in a complicated structure. Such a complicated structure increases a load for maintenance. In particular, when the complicated structure is accommodated in a container, the maintenance load is further increased.

An object of the present invention is therefore to provide a switchgear having a simple structure.

Solution to Problem

To solve the problem, a switchgear according to the present invention is characterized by having a sealed tank with an insulating gas enclosed therein; a fixed contact disposed in the sealed tank; a movable contact configured to come into contact with or separate from the fixed contact; and an operating mechanism configured to allow drive force for movement of the movable contact to be generated, wherein the operating mechanism for operating the movable contact includes one operating mechanism, and the one operating mechanism allows the movable contact to stop at three or more positions.

Advantageous Effects of the Invention

According to the present invention, there can be provided a switchgear that has a simple structure, and allows a movable contact to stop at three or more positions.

BRIEF DESCRIPTION OF THE DRAWINGS

FIGS. 15(a)-(d) illustrates an exemplary configuration of a link system for driving the interrupting/disconnecting unit according to the second embodiment.

FIG. 16 is a section diagram of a slide groove of the link system for driving the interrupting/disconnecting unit according to the second embodiment.

DESCRIPTION OF THE EMBODIMENTS

Figure 1:
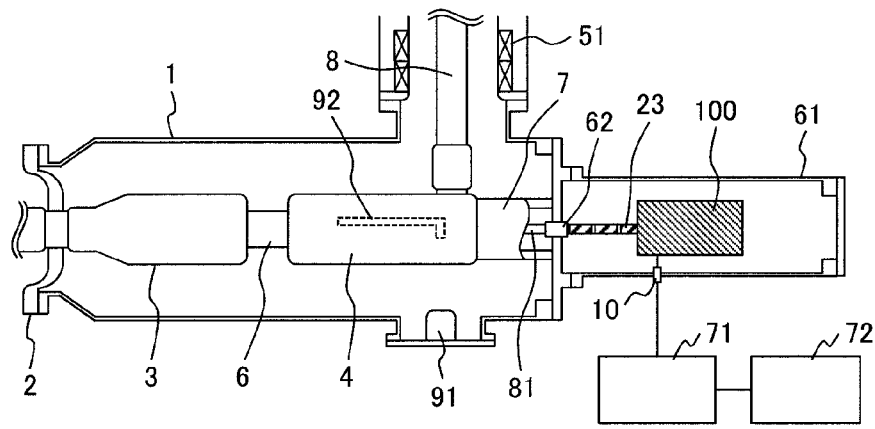
FIG. 1 is a configuration diagram illustrating a closed position of a switchgear according to a first embodiment.

Hereinafter, some preferred embodiments for carrying out the present invention will be described with accompanying drawings. The following description merely shows example embodiments, and is not intended to limit the content of the invention to the specific modes described below. It will be appreciated that the invention itself can be modified or altered into various modes within the scope satisfying the description of claims.

<First Embodiment>

A first embodiment is described with FIGS. 1 to 12. FIGS. 1 to 4 illustrate an example of a gas-insulated composite switch having a circuit breaker, a disconnector, and an earthing switch. As illustrated in the drawings, the composite switchgear according to the first embodiment is roughly configured of an interrupting unit for interrupting a fault current, a disconnecting unit for disconnecting an electric system, an earthing switch unit for earthing a high-voltage conductor, and an operating unit for operating each of the interrupting unit, the disconnecting unit, and the earthing switch unit.

Figure 2:
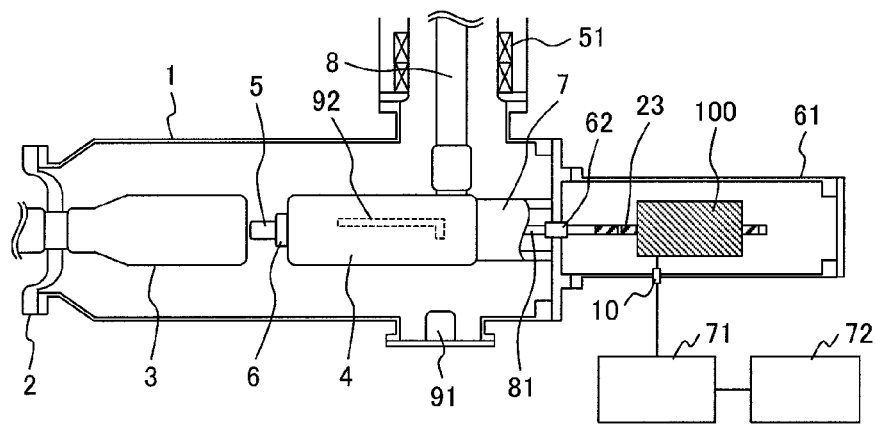
FIG. 2 is a configuration diagram illustrating an opened position of the switchgear according to the first embodiment.
Figure 3:
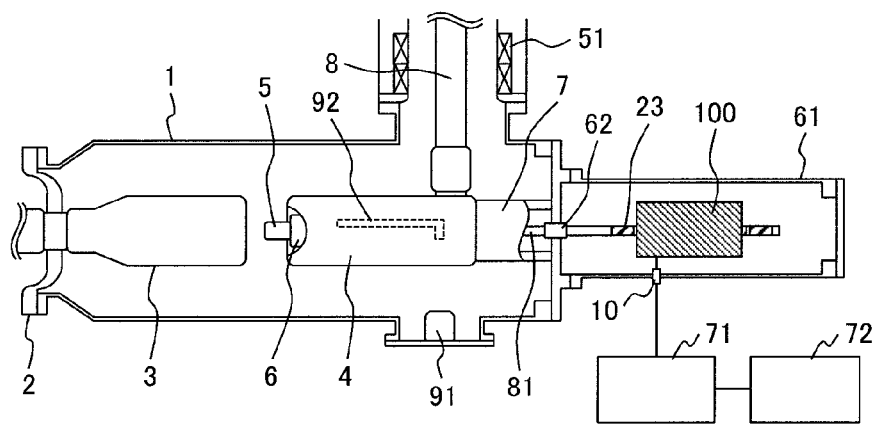
FIG. 3 is a configuration diagram illustrating a disconnected position of the switchgear according to the first embodiment.
Figure 4:
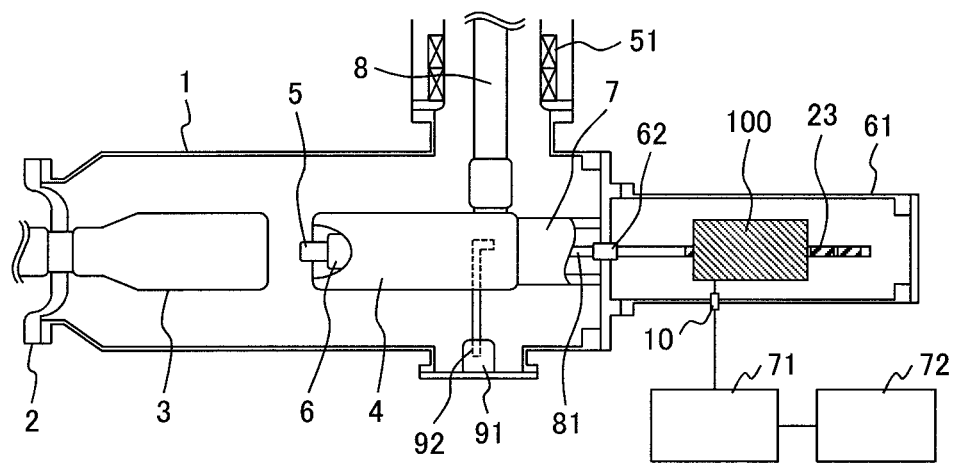
FIG. 4 is a configuration diagram illustrating an earthed position of the switchgear according to the first embodiment.
Figure 5:
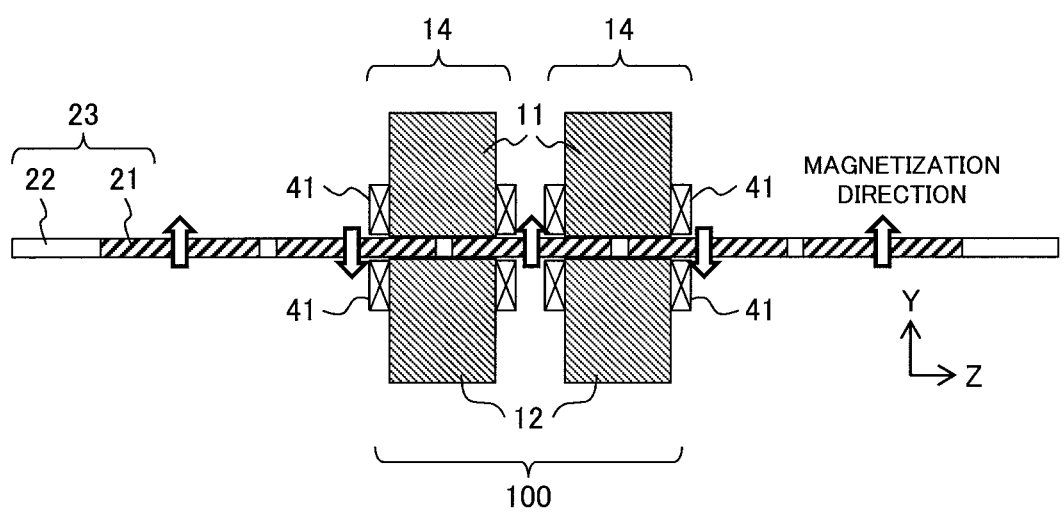
FIG. 5 illustrates one unit within an operating unit according to the first embodiment.

Hereinafter, one or all of the interrupting unit, the disconnecting unit, and the earthing switch unit is referred to as switching unit. FIG. 1 illustrates a close state (closed position) of the circuit breaker. FIG. 2 illustrates an opening state (opened position) of the circuit breaker. FIG. 3 illustrates an opening state (opened position) of the disconnector. FIG. 4 illustrates a closed position (earthed position) of the earthing switch.

As illustrated in FIGS. 1 to 4, the interrupting unit and the disconnecting unit collectively include, within a sealed metal enclosure 1 of which the inside is filled with $SF_6$ gas, a fixed side electrode (fixed side contact) 3 fixed to an insulating post spacer 2 provided at an end of the sealed metal enclosure 1, a movable side electrode 4 and a movable electrode (movable side contact) 6, a nozzle 5 provided between the two electrodes on a head of the movable side electrode 4, a cylindrical insulating post spacer 7 connected to a side close to the operating unit and to the movable side electrode 4, and a high-voltage conductor 8 connected to the movable side electrode 4 so as to be formed as a main circuit conductor configuring part of a main circuit. The movable side electrode 4 is moved through operating force from the operating unit to perform electrical switching, thereby allowing current making or current interruption.

A current transformer 51, which functions as a current detector for detecting a current flowing through the high-voltage conductor 8, is provided around the high-voltage conductor 8. An insulating rod 81 connected to the side close to the operating unit is disposed within the cylindrical insulating post spacer 7.

The earthing switch unit is provided within the sealed metal enclosure in which the interrupting unit and the disconnecting unit are provided. The earthing switch unit has an earthing-switch fixed electrode 91 on a bottom of the sealed enclosure, and has a blade-shaped earthing-switch movable electrode 92 provided in a freely rotatable manner.

The operating unit includes an actuator (operating force generator) 100 within an operating mechanism casing 61 provided adjacent to the sealed metal enclosure 1. A linearly movable mover 23 is disposed within the actuator 100. The mover 23 is connected to the insulating rod 81 via a linear sealing section 62 provided in such a manner that the mover 23 is movable while the sealed metal enclosure 1 is maintained airtight. The insulating rod 81 is connected to the movable electrode 6. In other words, the movable electrode 6 of the interrupting unit can be moved through movement of the mover 23.

The actuator 100 is electrically connected to a power supply unit 71 via a hermetic terminal 10 provided on a surface of the sealed metal enclosure 1 with the insulating gas enclosed therein. The power supply unit 71 is further connected to a control unit 72 so that it can receive an instruction from the control unit 72. The control unit 72 is designed to receive a current value detected by the current transformer 51. The power supply unit 71 and the control unit 72 collectively function as a control device that varies an amount or a phase of a current to be supplied to a winding 41 of the actuator 100 described below in accordance with the current value detected by the current transformer 51.

The control unit 72 sends, to the power supply unit 71, an instruction for controlling a pattern or timing of a current to be applied from the power supply unit 71 to the actuator 100. Varying the pattern or the timing of the current to be applied to the actuator 100 varies magnitude, timing, or the like of operating force to be applied from the actuator 100 to the movable electrode 6, so that movement speed, movement timing, a stop position, or the like can be finely controlled.

The actuator 100 for operating the movable electrode 6 includes one actuator 100 that allows the movable electrode 6 to stop at a plurality of positions of close, open, disconnecting, and earthing. According to the content described in the first embodiment, one operating mechanism allows the movable contact to stop at three or more positions, thereby an operating mechanism for open, an operating mechanism for disconnecting, and the like may not be separately provided, allowing the switchgear to be simplified.

The structure of the actuator is described with FIGS. 5 to 8. A stator 14 is configured of a combination of two units, each unit including a first magnetic pole 11, a second magnetic pole 12 disposed to be opposed to the first magnetic pole 11, a magnetic substance 13 connecting the first magnetic pole to the second magnetic pole, and a winding 41 provided on the outer circumference of each of the first and second magnetic poles 11 and 12. The first magnetic pole 11 and the second magnetic pole 12 are disposed at positions opposed to each other with a space therebetween in the inside of the stator 14. The mover 23 is disposed in the space, the mover 23 being configured of permanent magnets 21 that are mechanically connected to one another by a magnet fixing component or the like in a motion axis direction of the movable side contact while the N poles and the S poles are alternately inverted.

The permanent magnet 21 is magnetized in a Y axis direction (vertical direction in FIG. 5) alternately at each of adjacent magnets. The magnet fixing component 22 preferably, but not limitedly, includes a nonmagnetic material, for example, a nonmagnetic stainless alloy, an aluminum alloy, and a resin material. A mechanical component is provided in the actuator 100 in order to maintain a space between the permanent magnet 21 and each of the first magnetic pole 11 and the second magnetic pole 12. For example, a linear guide, a roller bearing, a cam follower, and a thrust bearing are preferred as the mechanical component, but any of other components may be used without limitation as long as the space between the permanent magnet 21 and each of the first magnetic pole 11 and the second magnetic pole 12 is maintained thereby.

In general, attractive force (force in the Y axis direction) is generated between the permanent magnet 21 and each of the first magnetic pole 11 and the second magnetic pole 12. In the configuration of the first embodiment, however, the attractive force generated between the permanent magnet 21 and the first magnetic pole 11 is in a direction opposite to a direction of the attractive force generated between the permanent magnet 21 and the second magnetic pole 12; hence, such attractive forces compensate each other and thus reduced. It is therefore possible to simplify a mechanism for holding the mover 23, and decrease mass of the movable body including the mover 23. Since mass of the movable body can be thus decreased, high acceleration drive and high response drive can be achieved. Since the stator 14 and the permanent magnet 21 are moved relative to each other in a Z axis direction (horizontal direction in FIG. 5), the mover 23 including the permanent magnet 21 moves in the Z axis direction by fixing the stator 14. Conversely, the stator 14 can be moved in the Z axis direction by fixing the mover 23. In such a case, the mover and the stator are reversed. A relative force is merely generated between the two.

When the actuator is driven, a magnetic field is generated through current application to the winding 41, thereby a thrust corresponding to a relative position between the stator 14 and the permanent magnet 21 can be generated. Furthermore, a magnitude and a direction of the thrust can be adjusted by controlling the positional relationship between the stator 14 and the permanent magnet 21, and controlling a phase or a magnitude of a current to be injected.

Movement of the mover 23 is controlled in such a manner that when the control unit 72 receives an opening signal or a closing signal, the control unit 72 allows the power supply unit 71 to apply a current to the actuator 100 in response to such a signal, so that the electric signal is converted into force for movement of the mover 23 of the actuator 100. The actuator 100 receives a current and is allowed to generate operating force, and thereby enables the movable side electrode to stop at three or more positions. Hence, the actuator 100 can be formed without a complicated link mechanism. In other words, the switchgear can be extremely simplified.

Figure 6:
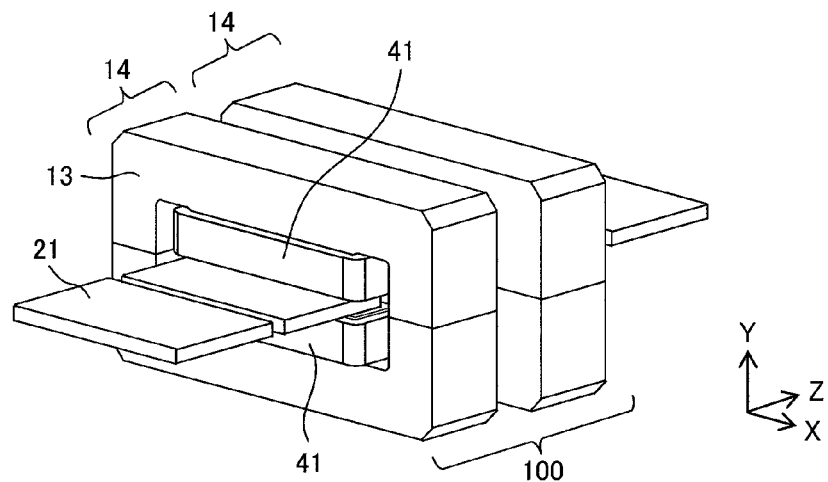
FIG. 6 is a perspective diagram for explaining one unit of an actuator according to the first embodiment.

FIG. 6 shows a perspective diagram of a configuration of one unit of the actuator 100. As illustrated in FIG. 6, the mover having the permanent magnet 21 moves in the Z axis direction relative to the stators 14 each including the first magnetic pole, the second magnetic pole, the magnet 13 connecting the first magnetic pole to the second magnetic pole, and the winding 41. A plurality of permanent magnets 21 are mechanically connected to one another by a magnet fixing component or the like, thereby a thrust is continuously provided in the Z axis direction, so that a movement distance can be increased.

In the first embodiment, the magnetic substance 13 connecting the first magnetic pole to the second magnetic pole is divided along the Y axis direction. This improves workability of the winding 41. Furthermore, the first magnetic pole 11 and the second magnetic pole 12 can be adjusted to be displaced from each other in the Z axis direction. When the first magnetic pole 11 and the second magnetic pole 12 are disposed to be displaced from each other, the thrust can be increased by varying a magnetization direction of each permanent magnet.

In addition, the mover can be basically driven in the Z axis direction without using the upper magnetic pole. Such a modification may be thus specifically considered. Noted that the mover is sandwiched by the first and second magnetic poles as in the configuration of the first embodiment, thereby small attractive force is generated between the permanent magnet and each magnetic pole. As a result, even if the mover is linearly moved, extremely small blurring occurs in a movement direction (the Z axis direction) and in a vertical direction (each of the X axis direction and the Y axis direction). Specifically, in the case of applying the actuator to a circuit breaker, even if the mover for transmitting operating force passes through the linear sealing section 62, since the linear sealing section 62 deforms only slightly, a small mechanical load is exerted on the sealing section.

This leads to not only prevention of a trouble in sliding motion of the linear sealing section 62 along with the movement but also prevention of tilt of a contact of the movable side electrode 4. Hence, there is provided a structure having a low possibility of scoring of a contact sliding section or contamination of a small metal foreigner from each electrode. The scoring may lead to a trouble in current interruption or current making, and the metal foreigner may lead to an insulation fault due to degradation in insulating performance. Furthermore, it is possible to decrease the amount of $SF_6$ gas that leaks to outside from the inside of the gas circuit breaker along with deformation of the seal. In this way, reliability of the circuit breaker can be improved from various viewpoints.

Figure 7:
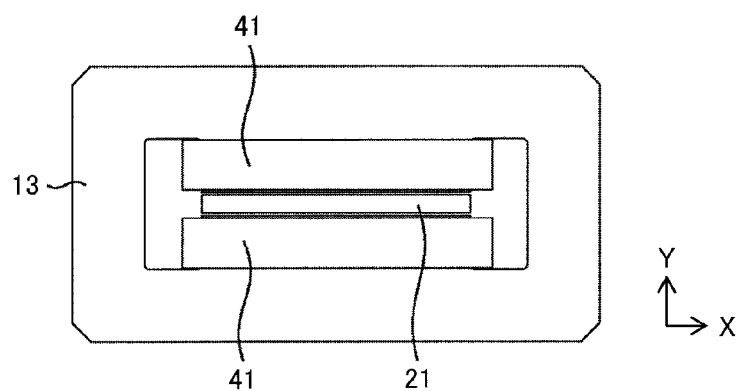
FIG. 7 is a front view of the configuration of FIG. 6.
Figure 8:
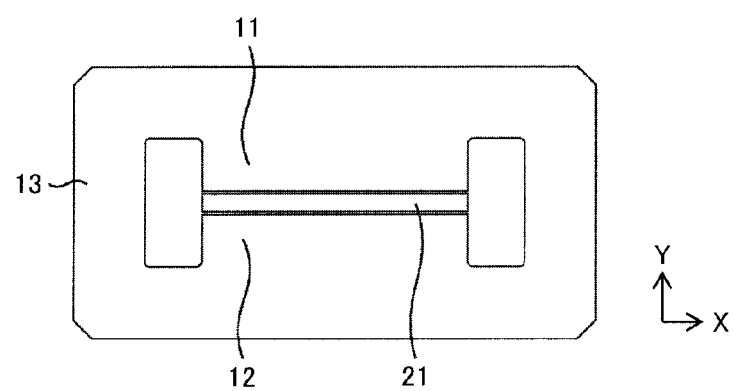
FIG. 8 illustrates a state where windings are removed from the configuration of FIG. 7.

FIG. 7 is a front view of the configuration of FIG. 6. FIG. 8 illustrates a state where the windings are removed from the configuration of FIG. 7 in order to easily understand a relationship between the first magnetic pole, the second magnetic pole, and the magnetic substance connecting the magnetic poles to each other in FIG. 7. As seen in FIGS. 7 and 8, the respective windings 41 are wound on the first magnetic pole 11 and the second magnetic pole 12, and are disposed so as to sandwich the permanent magnet 21. Since the winding 41 and the permanent magnet 21 are disposed to be opposed to each other, magnetic flux generated by the winding 41 efficiently acts on the permanent magnet 21.

Consequently, a small and light actuator is achieved. Furthermore, a magnetic circuit is closed by the first magnetic pole 11, the second magnetic pole 12, and the magnetic substance 13 connecting the first magnetic pole to the second magnetic pole. This allows a magnetic circuit path to be shortened. Consequently, a large thrust can be generated. Furthermore, since the periphery of the permanent magnet 21 is covered with the magnetic substance, the amount of flux leaking to outside can be decreased, and consequently influence on peripheral devices can be reduced.

Figure 9:
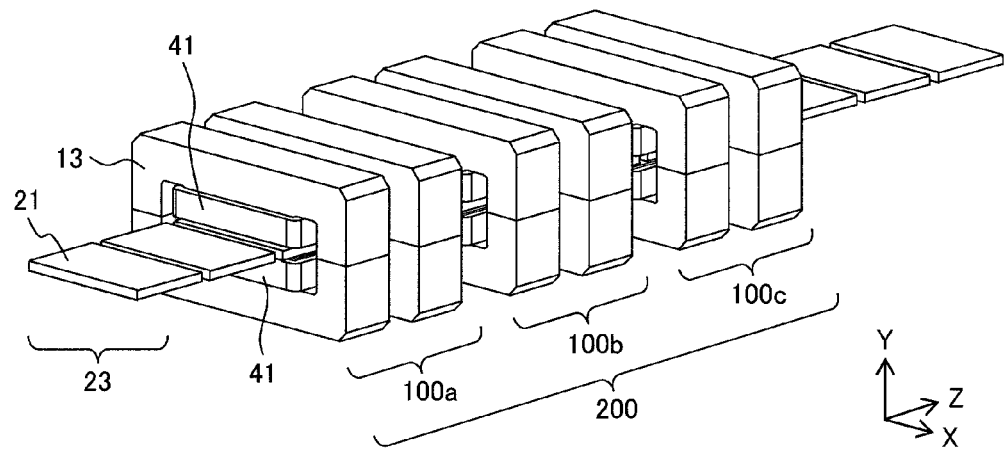
FIG. 9 is a configuration diagram of an operating mechanism with three actuators.

FIG. 9 illustrates an exemplary configuration of an operating mechanism including three-unit actuators 100a, 100b, and 100c disposed side by side in the Z axis direction (a movement direction of the movable electrode 6). One unit of the operating force generator is as described above. The three-unit actuators are disposed at positions at which the actuators are electrically shifted in phase from one another with respect to the permanent magnets 21. When one unit is configured of one stator, the three-unit actuators are configured of three stators. Similarly, when one unit is configured of N stators, the three-unit actuators are configured of 3×N stators (configured of stators in multiples of 3).

In the first embodiment, specifically, the actuators 100*b* and 100*c* are shifted by 120° (or 60°) and 240° (or 120°), respectively, in electrical phase with respect to the actuator 100*a*. In this actuator arrangement, application of a three-phase alternating current to the winding 41 of each actuator achieves operation similar to that of a three-phase linear motor. Using the three-unit actuators allows thrust adjustment through individually controlling currents of the actuators assumed as three independent actuators. Currents different in magnitude or phase can be injected from a control device into the respective windings of the actuators.

In one possible technique, a three-phase (UVW) current from one AC power supply is dividedly supplied. In this case, a plurality of power supplies may not be provided, i.e., a simple configuration is given. Furthermore, in this case, optional determination can be made on whether the above-described hermetic terminal is also provided as a combination of 3×N hermetic terminals, or a hermetic terminal 10 is shared among actuators to which the same current is applied.

Figure 10:
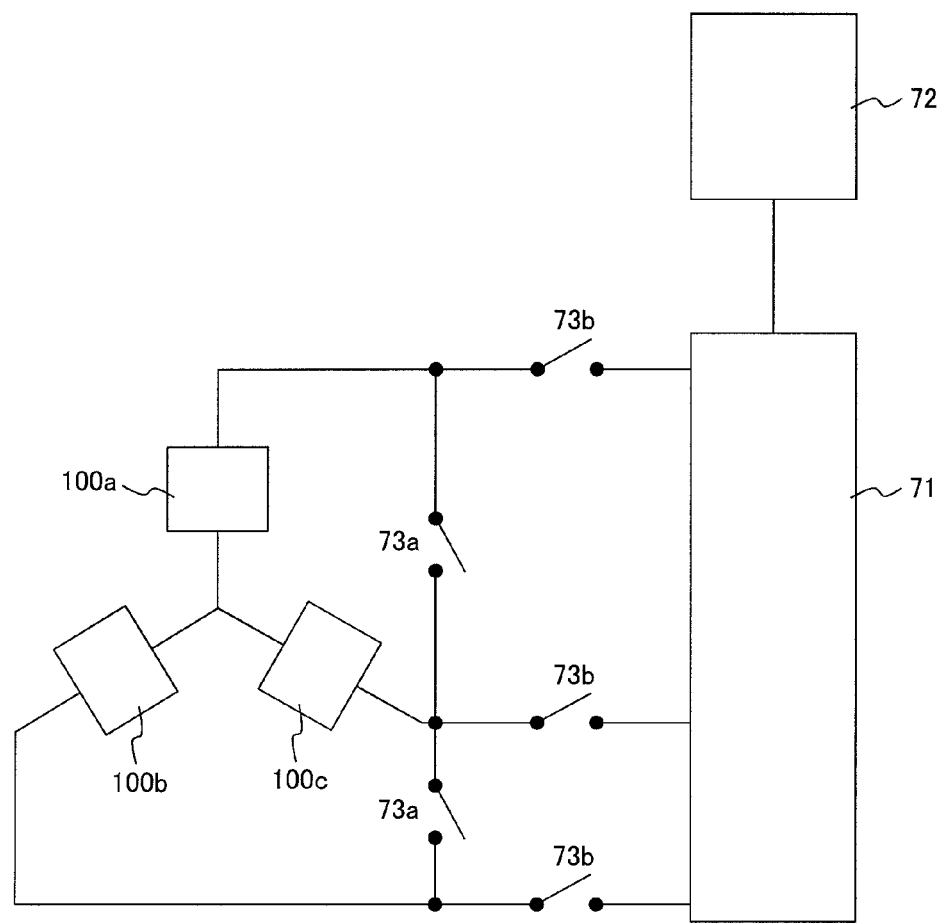
FIG. 10 is a connection diagram illustrating connection among the three actuators.

FIG. 10 illustrates an exemplary connection method among the three actuators 100*a*, 100*b*, and 100*c*. The actuators 100*a*, 100*b*, and 100*c* are each electrically connected to the power supply unit 71. The power supply unit includes an inverter, and controls a current to be supplied to a three-phase motor in response to an instruction from the control unit 72, and thus achieves an appropriately provided drive pattern. In the exemplary connection among the three actuators 100*a*, 100*b*, and 100*c*, a switch 73*b* is provided between each actuator and the power supply unit 71, and a switch 73*a* is provided between any two of the intermediates of the respective actuators and the respective switches 73*b*.

Description is now made on a method of providing any of the closed position, the opened position, the disconnected position, and the earthed position by one operating mechanism. In the electromagnetic actuator of the first embodiment, a magnitude or a direction of the thrust is varied depending on a magnetization direction of the permanent magnet 21 or a positional relationship between the first magnetic pole 11 and the second magnetic pole 12. Consequently, the magnitude and the direction of the thrust can be controlled by varying a magnitude and polarity of the current depending on a position of the mover.

Furthermore, as illustrated in FIG. 9, when the actuators 100 are arranged in series with respect to the mover 23 and are thus allowed to operate as a three-phase motor, a constant thrust can be provided regardless of a position of the mover.

In the first embodiment, the mover 23 can be stopped or held at an appropriate position. That is, although the mover is stopped or held at two positions, i.e., a starting point and an end point, in a conventional operating mechanism, the mover 23 can be stopped or held at intermediate positions, for example, an open position and a disconnecting position. In the exemplary connection of FIG. 10, when a current is controlled to vary a position of the mover, each switch 73*b* is closed while each switch 73*a* is opened.

Consequently, the position of the mover 23 can be controllably varied by the power supply unit 71 and the control unit 72. On the other hand, when the mover 23 is stopped or held at a position, each switch 73*b* is opened while each switch 73*a* is closed. Consequently, the windings of the actuators 100*a*, 100*b*, and 100*c* are short-circuited, and a short-circuit current is generated so as to prevent movement of the mover, so that the position of the mover can be restrained.

Figure 11:
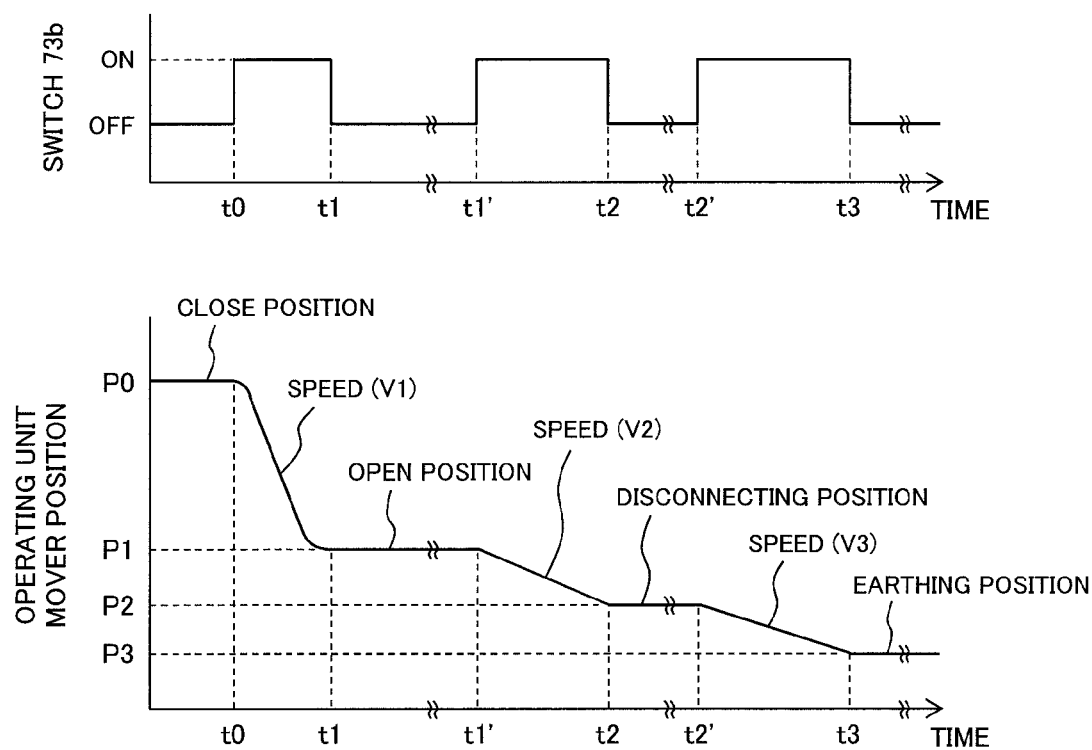
FIG. 11 includes a schematic illustration of an operating-unit stroke, and a schematic illustration of positions of close, open, disconnecting, and earthing.

FIG. 11 illustrates an exemplary drive pattern that varies the mover position in order of the close position, the open position, the disconnecting position, and the earthing position. FIG. 11 includes a schematic illustration of temporal characteristics of operation including open, disconnecting, and earthing. The mover of the operating unit has a starting point P0 and an end point P3, and is configured to be allowed to stop at an appropriate position by the actuator 100 as described above. In the first embodiment, the mover 23 has an intermediate fixed point P1 corresponding to the open position, and an intermediate fixed point P2 corresponding to the disconnecting position.

P0 is the close position of the interrupting unit. When the operating unit receives an open signal at time t0, the interrupting unit moves to the open position P1 at high speed. Operating time is tens of seconds. At time t1, while the interrupting unit is stopped at the open position P1, each switch 73*a* for short-circuiting each winding is short-circuited to restrain the mover position, so that the open position P1 is held. When the operating unit receives an opening signal (not shown) at the open position P1, each switch 73*a* is opened to supply a current to the winding 41 of each actuator 100, so that the interrupting unit is closed.

When the mover 23 is located at the position P1, and when the operating unit receives a disconnecting signal at time t1', the mover 23 is moved to the disconnecting position P2. Since current is not necessary be interrupted during disconnection, speed V2 of disconnecting operation may be lower than the open speed V1. When the operating unit receives a closing signal at the disconnecting position P2, a disconnecting/interrupting unit moves to the close position P0.

The disconnecting operation may be performed in such a manner that when the mover is located at the position P0, the mover is directly moved to the disconnecting position P2. In this case, the mover 23 is not stopped at the opened position P1. In addition, the movement speed may be lower than the open speed V1. A period from t2 to t2' can be appropriately set. During this period, as in the above-described case where the mover 23 is stopped or held at a position, the switch should be opened or closed, and each switch 73*a* for short-circuiting each winding 41 is short-circuited to restrain the mover position, so that the disconnecting position P2 is held.

When the operating unit further receives an earthing signal at the disconnecting position P2, the operating unit mover 23 is moved to the position P3, and the earthing-switch movable electrode 92 described later is brought into contact with the earthing-switch fixed electrode 91, and the high-voltage conductor 8 is earthed. When a short-circuit close specification is not required, movement speed V3 during earthing may also be lower than V1. When the short-circuit close specification is required for the earthing switch, an exciting current of the electromagnetic actuator 100 is controlled to be increased to increase the close speed V3.

When the operating unit mover 23 is located at the position P3 as the end point of the operating unit, and when the operating unit receives an opening signal of the earthing switch unit, the operating unit mover 23 is moved to the position P2. Consequently, the earthed position is shifted into the disconnected position.

An exemplary configuration of an earthing switch in the first embodiment is now described with FIGS. 12(*a*)-(*d*). The earthing switch is configured of the blade-shaped earthing-switch movable electrode 92 rotatably supported on a rotation axis 95, the earthing-switch fixed electrode 91 configured to come into contact with or separate from the earthing-switch movable electrode 92, a slide pin 93 that is bound to an insulating rod connected to the operating unit so as to operate in conjunction with the movable electrode 6, and a tension spring 94 for holding the earthing position.

Figure 12A:
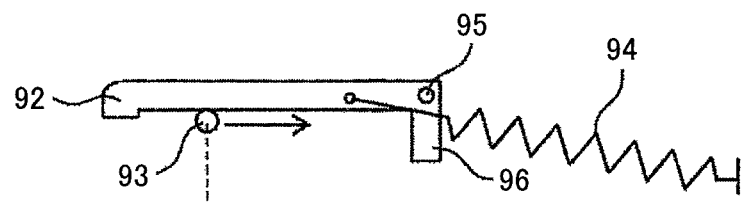
FIGS. 12(a)-(d) shows schematic illustrations of operation of an earthing switch unit according to the first embodiment.

The state of FIG. 12(a) corresponds to a case where the interrupting unit and the disconnecting unit perform switching operation in a period from time t1 to time t2 in FIG. 11. The slide pin 93 is configured to slide while being in contact with the earthing-switch movable electrode 92 that is maintained to be roughly fixed.

Figure 12B:
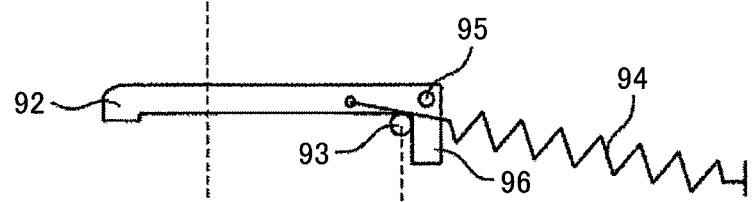
Figure 12C:
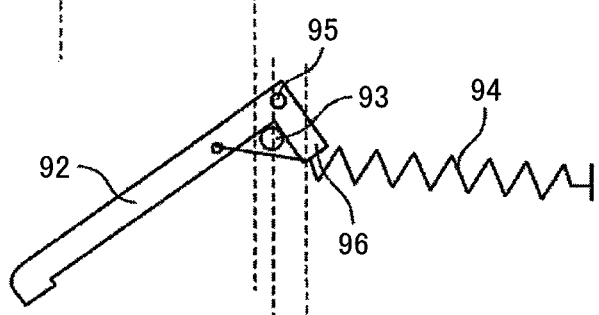

FIG. 12(b) illustrates a positional relationship between the slide pin 93 and the earthing-switch movable electrode in the disconnected position (time t2 to time t2' in FIG. 11). When the operating unit is further driven so that the mode is shifted into a mode where the earthing switch unit performs switching operation, the slide pin 93 pushes a pin engagement section 96 provided in a direction substantially perpendicular to the movement direction of the pin, thereby the earthing-switch movable electrode 92 rotates about the rotation axis 95 (intermediate between time t2' and time t3 in FIG. 11).

Figure 12D:
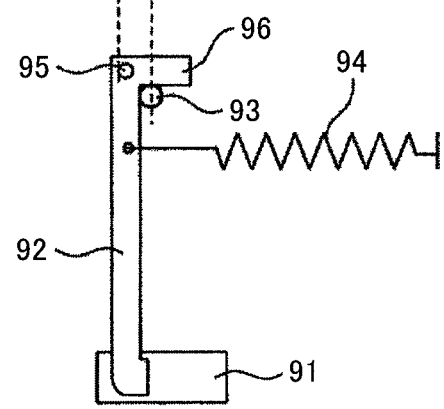
Figure 13:
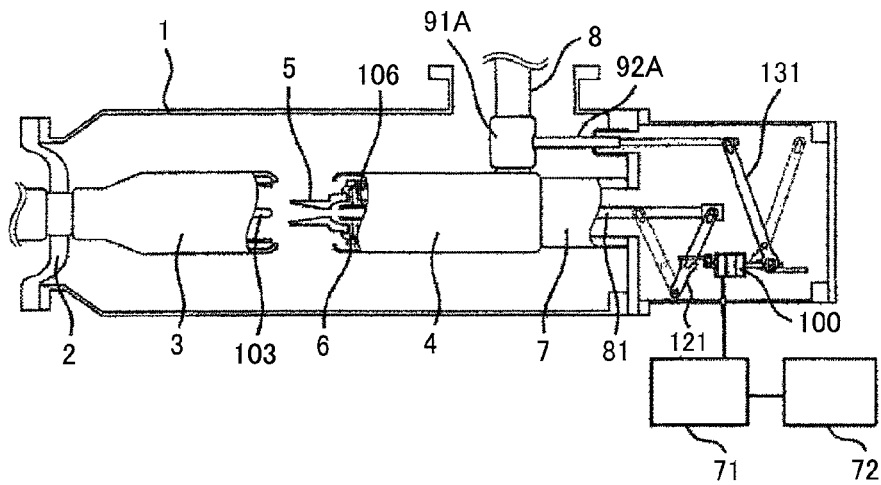
FIG. 13 is a configuration diagram of a switchgear according to a second embodiment.

FIG. 12(d) illustrates the earthed position (time t3 in FIG. 11) in which the earthing-switch movable electrode 92 engages with the earthing-switch fixed electrode 91 in a contact manner, and an undepicted high-voltage conductor is earthed. The tension spring 94 holds the earthing position such that the earthing-switch movable electrode is not easily moved in a separation direction.

The gas insulated switchgear according to the first embodiment configured as described above is shifted from the closed position of FIG. 1 to the opened position of FIG. 2 to interrupt a current. In this operation, $SF_6$ gas having arc quenching ability is blown to arc generated in the interrupting unit, so that arc plasma is dissipated and a fault current is interrupted.

Furthermore, the movable electrode is moved from the opened position to such a position that the interelectrode distance is lengthened, thereby the electric system circuit can be maintained to the disconnected position. In this way, the closed position, the opened position, and the disconnected position can be provided through operation of one actuator, so that the number of operating mechanisms can be decreased, and consequently a reliable gas insulated switchgear can be produced at low cost. Furthermore, in the first embodiment, the earthing switch is also configured to be driven by one operating mechanism, and therefore a further inexpensive and reliable gas insulated switchgear can be produced.

According to the first embodiment, the circuit breaker is equipped with the actuator including the mover having the permanent magnets arranged in a direction along which drive force of the actuator is generated, and the magnetic poles that are each disposed to be opposed to the mover and each have the winding. Hence, the mover can be decreased in weight as compared with the case where the winding is moved. In addition, the mover may not be wired unlike the case where the winding is moved. Consequently, reliability can be improved.

Although the first embodiment has been described with the case of using the permanent magnet, the actuator can be configured using a magnetic substance disposed in the mover in place of the permanent magnet. The magnetic substance refers to a member that receives attractive force from a magnet, and typically includes iron, a silicon steel sheet, and the like.

In the first embodiment, gas spaces are separately provided for the switching unit and the operating unit, and the operating unit is driven via the linear sealing section 62. However, a common gas space may be provided for the switching unit and the operating unit so that the operating unit is filled with the same high-pressure $SF_6$ gas as that for the switching unit. As illustrated in FIG. 1, in the case where the gas spaces are separately provided for the interrupting unit and the operating unit, the interrupting unit is filled with high-pressure $SF_6$ gas, while the operating mechanism casing 61 of the operating unit is sealed or unsealed from outside (the atmosphere) depending on cases.

In the case where the operating unit is sealed, the inside of the operating mechanism casing 61 is filled with dry air, nitrogen, or $SF_6$ gas at atmospheric pressure. When the operating unit is sealed, the operating unit is less likely to be affected by external environment, and factors of degradation in performance, such as humidity, rainwater, and entering of insects or the like, can be eliminated; hence, a reliable operating unit can be provided. However, when the operating unit is sealed, internal inspection is difficult; hence, if a trouble occurs in the operating unit, it is difficult to detect an internal abnormal factor, or simply perform internal maintenance and inspection. If easiness of such internal inspection is prioritized, the metal enclosure 1 may not be sealed.

Although the first embodiment shows the exemplary case where the actuator 100 is configured of the two stators 14, it is obvious that the number of stators is not limited thereto. An actuator including only one stator may also be driven as the operating mechanism of the circuit breaker. On the other hand, increasing the number of stators makes it possible to provide a larger thrust in proportion to the number.

<Second Embodiment>

A second embodiment is described with FIGS. 13 to 19. Certain configurations are designated by the same numerals as those in the above description, and certain portions have the same functions as those therein, and duplicated description of them is omitted.

The interrupting unit and the disconnecting unit are configured in one unit, and a fixed-side arc contact 103 is provided within the fixed-side electrode 3. A movable-side arc contact 106 that operates together with the movable electrode 6 is provided in the movable electrode 6. The interrupting unit combined with the disconnecting unit in the second embodiment is referred to as disconnecting/interrupting unit. The movable electrode 6 and the arc contact 106 are connected to the insulating rod 81 that is connected to the actuator via an interruption/disconnection drive link system.

The earthing switch unit is configured of a rod-like earthing-switch movable electrode 92A and an earthing-switch fixed electrode 91A attached to a high-voltage conductor 8. The earthing-switch movable electrode 92A is connected to the actuator via an earthing-switch-unit drive link system so as to perform linear movement. The earthing-switch-unit drive link system is configured such that the earthing-switch movable electrode 92A is moved in a direction opposite to a movement direction of the actuator.

In the configuration of the second embodiment, the disconnecting/interrupting unit operates between the open position P1 and the disconnecting position P2 (time t1' to time t2) in FIG. 11, and the earthing switch unit operates between the disconnecting position P2 and the earthing position P3 (time t2' to time t3) in FIG. 11. Each link system is configured such that each of the disconnecting/interrupting unit and the earthing switch unit can perform intermittent operation.

Figure 14A:
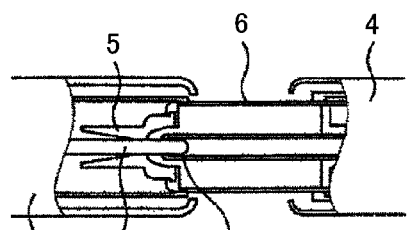
FIGS. 14(a)-(c) shows schematic illustrations of operation of an interrupting unit combined with a disconnecting unit of the switchgear according to the second embodiment.
Figure 14B:
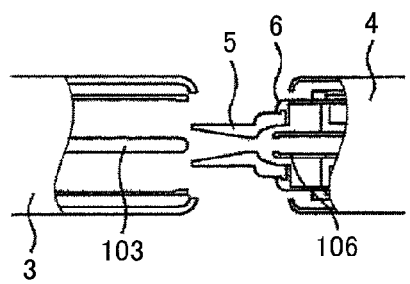
Figure 14C:
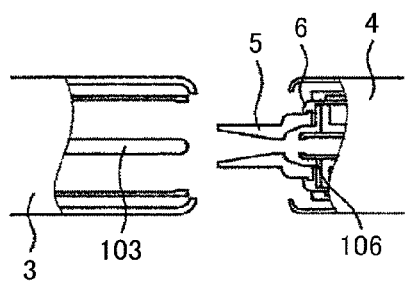

First, operation of the disconnecting/interrupting unit is described with FIGS. 14 to 16. FIG. 14(a) illustrates a closed position of the disconnecting/interrupting unit, FIG. 14(b) illustrates an opened position thereof, and FIG. 14(c) illustrates a disconnected position thereof. The interelectrode distance at the disconnected position is set to about 1.1 to 1.5 times longer than that at the opened position, i.e., the disconnecting/interrupting unit is designed to have sufficient dielectric strength at the disconnected position.

FIGS. 15(a)-(d) illustrates illustrate an exemplary link system that allows intermittent operation of the disconnecting/interrupting unit. An operating rod 123 is in engagement with the mover 23 of the undepicted actuator. A connecting pin 124, which moves with the movable electrode 6, is attached to the operating rod. The connecting pin 124 moves along a groove 125.

FIG. 16 illustrates a shape of the slide groove 125 for limiting a position of the connecting pin. The slide groove 125 is in a positional relationship where when a switching mechanism is transferred from disconnecting to earthing (and vice versa), a difference in level occurs. The pin 124 moves in a vertical direction of a paper plane in accordance with movement of the mover in a horizontal direction of the paper plane. In this configuration, the pin 124 engages with a lever 121 at a position in a groove 125a (between close and open or between open and disconnecting), and the pin 124 disengages from the lever 121 at a position in a groove 125b (between disconnecting and earthing).

To describe using FIG. 11 as with the first embodiment, FIG. 15(a) illustrates a state of the link system at the close position P0 (time t0) of the disconnecting/interrupting unit, in which the connecting pin 124 is in engagement with an engagement groove 121c of a lever 121a, and the lever 121 rotates about a rotation axis 121b along with movement of the connecting pin until reaching the open position. The lever 121a is connected to the movable electrode of the disconnecting/interrupting unit at its undepicted end, so that the disconnecting/interrupting unit linearly moves along with rotation of the lever 121a.

FIG. 15(b) illustrates a state of the link system at the open position P1 (time t1 to time t1'), during which the disconnecting/interrupting unit is linearly moving. In this state, as described in the first embodiment, when windings of the actuator are short-circuited, the open position is maintained. An operating rod 123b has a notch (in the drawing, a portion depicted by a line extending in an upper right direction) such that a lever holding surface 121d is allowed to be flush against the operating rod 123b. In the state of FIG. 15(b), the holding surface 121d of the operating rod is located in the notch. An operating rod 133b described later also has a notch so that a lever 131 fits in the notch in a state of FIG. 18(d).

FIG. 15(c) illustrates a state of the link system at the disconnecting position P2 (time t2 to time t2'). When the mover 23 further moves in an opening direction, the pin 124 moves upward along the groove 125, and is thus disengaged from the lever 121a. Consequently, even if the mover 23 is operated to further move in the opening direction, the lever 121a does not receive the operating force of the operating mechanism, and the disconnecting/interrupting unit connected to the lever 121a is maintained stopped. Thus, a fixed surface 121d of the lever comes into contact with a surface of 123b, so that rotation of the lever 121a is limited, and a stop position of the disconnecting/interrupting unit is mechanically held.

FIG. 15(d) illustrates a state of the link system at the earthing position P3 (time t3). The engagement groove 121c is not in engagement with the connecting pin 124, the interrupting/disconnecting unit is fixed, and the disconnecting position is held by the position holding surface 121d of the lever and 123b.

Figure 17A:
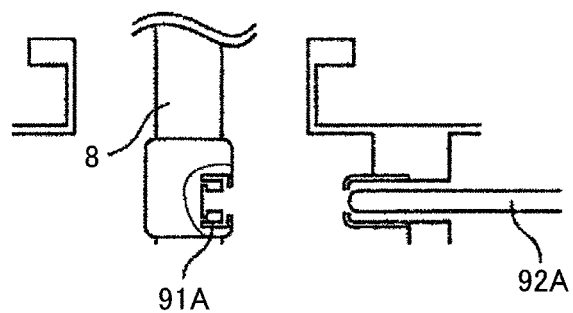
FIGS. 17(a) and (b) shows schematic illustrations of operation of an earthing switch unit of the switchgear according to the second embodiment.
Figure 17B:
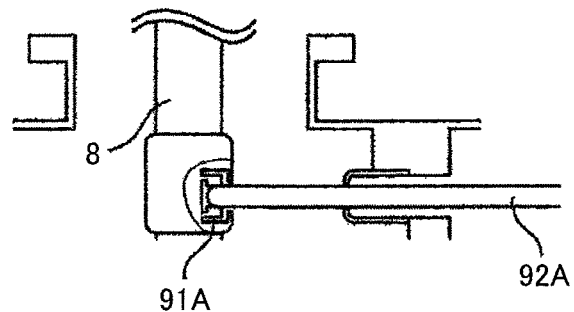

Subsequently, operation of the earthing switch unit is described with FIGS. 17 to 19. FIG. 17(a) illustrates an opening state of the earthing switch unit, and FIG. 17(b) illustrates an earthed position thereof. FIG. 18 illustrates an exemplary link system that allows the earthing switch unit to perform intermittent operation. An operating rod 133 is in engagement with the mover 23 of the undepicted actuator. A connecting pin 134 is attached to the operating rod. The connecting pin 134 moves along a groove 135.

Figure 19:
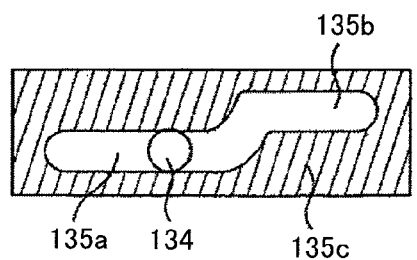
FIG. 19 is a section diagram of a slide groove of the link system for driving the earthing switch unit according to the second embodiment.

FIG. 19 is a section diagram illustrating the slide groove 135 for limiting a position of the connecting pin. The pin 134 moves in a vertical direction of a paper plane in accordance with movement of the mover in a horizontal direction of the paper plane. The pin 134 disengages from a lever 131 at a position in a groove 125b, and the pin 134 engages with the lever 131 at a position in a groove 135a.

Figure 18A:
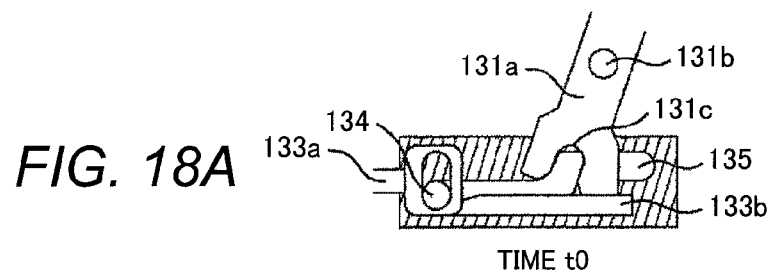
FIGS. 18(a)-(d) illustrates an exemplary configuration of a link system for driving the earthing switch unit according to the second embodiment.

FIG. 18(a) illustrates a state of the link system of the earthing switch unit at the close position P0 (time t0), in which the earthing switch unit is in the opening state of FIG. 17(a). An engagement groove 131c is not in engagement with the connecting pin 134, and the earthing-switch movable electrode is fixed. In addition, a position of the earthing-switch movable electrode is held by a position holding surface 131d of the lever and a position holding rod 133b, and thus even if the mover 23 moves, the opening state of the earthing switch unit is maintained.

Figure 18B:
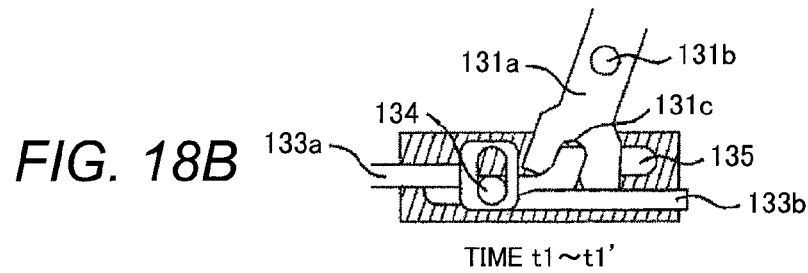

FIG. 18(b) illustrates a state of the link system at the open position P1 (time t1 to time t1'). As with the above-described state at the close position P1, the engagement groove 131c is not in engagement with the connecting pin 134, and thus the earthing-switch movable electrode does not receive the operating force of the operating mechanism and is fixed. In addition, a position of the earthing-switch movable electrode is held by the position holding surface 131d of the lever and the position holding rod 133b, and thus even if the mover moves, the opening state of the earthing switch unit is maintained.

Figure 18C:
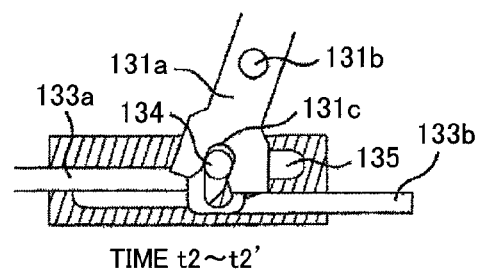

FIG. 18(c) illustrates a state of the link system at the disconnecting position P2 (time t2 to time t2'). The connecting pin 134 is in engagement with an engagement groove 131c of a lever 131a. Furthermore, in a state where the connecting pin moves through movement of the mover (t2' to t3), the lever 131a rotates about a rotation axis 131b. The lever 131a is connected to the earthing-switch movable electrode at its undepicted end, and thus the earthing-switch movable electrode substantially linearly moves in a direction opposite to the movement direction of the mover along with rotation of the lever 131.

Figure 18D:
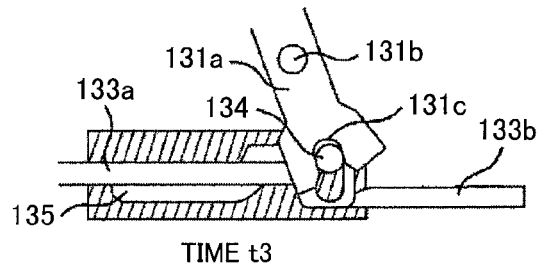

FIG. 18(d) illustrates a state of the link system at the earthing position P3 (an end point). The earthing switch unit is at the closing position illustrated in FIG. 17(b), i.e., the switchgear is at the earthing position.

FIG. 19 illustrates a shape of the slide groove 135 for limiting a position of the connecting pin. The slide groove 135 is in a positional relationship where when a switching mechanism is transferred from disconnecting to earthing (and vice versa), a difference in level occurs. The pin 134 moves in a vertical direction of a paper plane in accordance with movement of the mover in a horizontal direction of the paper plane. In this configuration, the pin 134 disengages from the lever 131 at a position in the groove 135a (between close and open or between open and disconnecting), and the pin 134 engages with the lever 131 at a position in the groove 125b (between disconnecting and earthing).

The earthing-switch movable electrode is connected to the lever 131a. In addition, the connecting pin 134 is in engagement with the engagement groove 131c, so that when a fixed state of the mover 23 is held, the earthed position is also held. A position of the mover 23 is held by controlling each winding of the actuator to be short-circuited. The position can be more reliably held by further using a mechanical latch mechanism (not shown in the second embodiment).

As in the configuration of the second embodiment, there is provided the pin that operates in conjunction with each of the movable side electrode and the earthing-switch movable electrode, and each pin is engaged with the operating lever so that operating force from the operating mechanism is transmitted to the operating lever in accordance with a positional relationship. In this case, four positions of close, open, disconnecting, and earthing can also be switched from one another by one operating mechanism as in the first embodiment.

According to the first and second embodiments, one operating mechanism is used to perform switching operation of one or all of the circuit breaker, the disconnector, and the earthing switch. This reduces the number of operating mechanisms required in a conventional switchgear. Hence, the switchgear can be reduced in size, and maintenance cost can be reduced through decrease in number of portions to be subjected to maintenance and inspection.

<Third Embodiment>

Figure 20:
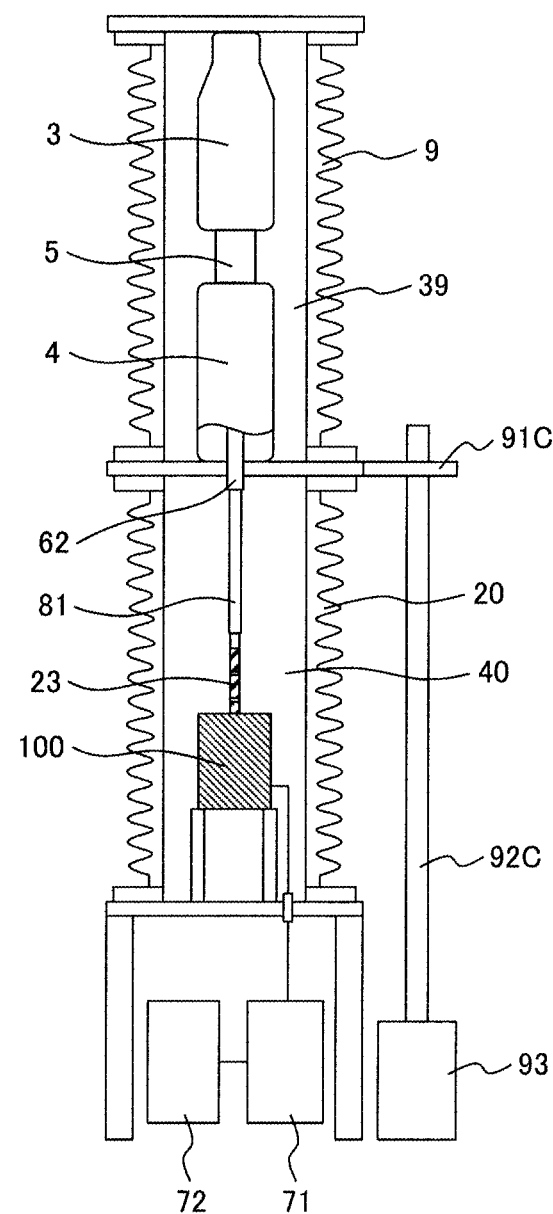
FIG. 20 is a configuration diagram of an insulator-type circuit breaker with a disconnecting function according to a third embodiment.

A third embodiment is described with FIG. 20. A gas circuit breaker according to the third embodiment includes, within an insulating enclosure 9 formed of an insulator consisting of an insulating material or the like, a fixed side electrode 3 acting as a fixed side contact, a movable electrode 6 configured to come into contact with or separate from the fixed side electrode 3 so as to act as a movable side contact, and a nozzle 5 provided on a head of the movable electrode 6 on a side close to the fixed side electrode 3, where $SF_6$ gas is enclosed as an insulating gas within the insulating enclosure 9.

Another gas may be used as the insulating gas, examples of which specifically include a mixed gas of $SF_6$ and $N_2$ or $CF_4$ and alternative gas to $SF_6$ gas, such as $CO_2$ gas. The interrupting unit is formed as a disconnecting/interrupting unit that also serves as the disconnecting unit. Another insulating enclosure 20 accommodating the operating unit is provided on a lower side of the insulating enclosure 9 accommodating the disconnecting/interrupting unit.

In the insulating enclosure 20, there are disposed an actuator 100, a mover 23 configured to project toward the interrupting unit from the inside of the actuator, an insulating rod 81 provided on a head of the mover 23 on a side close to the interrupting unit, and a linear sealing section 62 connecting the insulating rod 81 to the movable side electrode 4. An insulating gas similar to that in the insulating enclosure 9 is also enclosed within the insulating enclosure 20.

In the third embodiment, the earthing switch is provided outside the insulating enclosure, and the operating unit of the earthing switch is not common to the operating unit of the disconnecting/interrupting unit. In the switchgear including the interrupting unit and the disconnecting unit that are combined in the above manner, an electromagnetic actuator is used to provide an intermediate fixed point, thereby the interrupting function and the disconnecting function can also be achieved by one operating mechanism, and consequently a reliable gas insulated switchgear can be provided at low cost.

According to the first to third embodiments, an electric motor is used in the operating mechanism, and low-speed drive is performed in disconnecting or earthing operation other than interrupting operation required to be high-speed and high-thrust operation, thereby mechanical stress is reduced, leading to long life of the operating mechanism. The number of components of the entire operating mechanism is decreased by integrating individual operating mechanisms, thereby reliability of a composite switchgear can be improved.

In addition, it is possible to flexibly cope with customer specifications for an earthing switch, to which short-circuit close is required, in that current close speed is easily increased only by increasing the amount of current supplied from a power supply without any additional device.

REFERENCE SIGNS LIST 1 metal enclosure
2 insulating post spacer
3 fixed side electrode
4 movable side electrode
5 nozzle
7 cylindrical insulating post spacer
8 high-voltage conductor
9 interrupting-unit insulating enclosure
10 hermetic terminal
11 first magnetic pole
12 second magnetic pole
13 magnetic substance
14 stator
20 interrupting-unit support insulating enclosure
21 permanent magnet
22 magnet fixing component
23 mover
39, 40 gas space
41 winding
51 current transformer
61 operating mechanism casing
62 linear sealing section
71 power supply unit
72 control unit
73 winding connection changeover switch
81 insulating rod
91, 91A earthing-switch fixed electrode
92, 92A earthing-switch movable electrode
93 slide pin
94 tension spring
95 blade-shaped earthing-switch-electrode rotation axis
96 pin engagement section
100 actuator
103 fixed-side arc contact
106 movable-side arc contact
121 disconnecting/interrupting unit operating lever
123, 133 operating rod
124 134 connecting pin
125, 135 slide groove
131 earthing-switch operating lever

The invention claimed is:
1. A switchgear comprising:
a sealed tank with an insulating gas enclosed therein;
a fixed contact disposed in the sealed tank;
a movable contact coming into contact with or separating from the fixed contact; and an operating mechanism allowing drive force for movement of the movable contact to be generated, wherein
the operating mechanism for operating the movable contact allows the movable contact to stop at three or more positions,
the operating mechanism generates operating force through current reception;
the switchgear further comprises a power supply driving the operating mechanism, and a control device controlling a pattern and/or timing of a current to be applied from the power supply to the operating mechanism, and
the operating mechanism includes a mover including permanent magnets or magnetic materials arranged in a motion axis direction of the mover while N poles and S poles are alternately inverted, magnetic poles disposed to be opposed to the N poles and the S poles of the mover, and windings, and allows the mover to stop linearly at three or more positions.

2. The switchgear according to claim 1, wherein
the one operating mechanism is formed of a plurality of operating force generators,
switches are disposed between respective operating force generators and the power supply, and
each respective pair of operating force generators and the switches associated with the respective pair of operating force generators are connected to each other via another switch.

3. The switchgear according to claim 1, wherein
the mover stops at four positions of close, open, disconnecting, and earthing,
the fixed contact is an earthing-switch fixed electrode, and
the movable contact is an earthing-switch movable electrode.

4. The switchgear according to claim 3, further comprising:
a pin operating in conjunction with the movable contact, wherein
the earthing-switch movable electrode is rotatably supported on a rotation axis, and has an engagement section that rotates about the rotation axis while being in engagement with the pin, and
during transfer from the disconnecting position to the earthing position, the pin pushes the engagement section, thereby the earthing-switch movable electrode rotates about the rotation axis and comes into contact with the earthing-switch fixed electrode.

5. The switchgear according to claim 4, further comprising:
a support spring supporting the earthing-switch movable electrode at the earthing position.

6. The switchgear according to claim 3, further comprising:
a first connecting pin to close, open, and disconnect, the connecting pin moving in conjunction with the mover;
a second connecting pin for earthing, the second connecting pin operating in conjunction with the mover;
a first operating lever to connect to the mover, engage with the first connecting pin to close, open, and disconnect during close, open, and disconnecting operations, respectively, and receive operating force of the operating mechanism; and
a second operating lever to connect to the mover, come in engagement with the second connecting pin for earthing during earthing operation, and receive operating force of the operating mechanism.

7. The switchgear according to claim 1, wherein
the fixed contact is an earthing-switch fixed electrode;
the movable contact is an earthing-switch movable electrode ; and
the operating mechanism operates the earthing-switch movable electrode.

8. A switchgear comprising:
a sealed tank with an insulating gas enclosed therein;
a fixed contact disposed in the sealed tank;
a movable contact coming into contact with or separating from the fixed contact;
an operating mechanism allowing drive force for movement of the movable contact to be generated, the operating mechanism for operating the movable contact generating operating force through current reception;
a power supply that drives the operating mechanism;
a control device that controls a pattern and/or timing of a current to be applied from the power supply to the operating mechanism; and
outside the sealed tank, an earthing-switch fixed electrode, an earthing-switch movable electrode that comes into contact with or separate from the earthing-switch fixed electrode, and an operating mechanism for operating the earthing-switch movable electrode, wherein
the operating mechanism includes a mover including permanent magnets or magnetic materials arranged in a motion axis direction of the mover while N poles and S poles are alternately inverted, magnetic poles disposed to be opposed to the N poles and the S poles of the mover, and windings, and allows the mover to stop linearly at three or more positions.

* * * * *